(12) United States Patent
Hyun et al.

(10) Patent No.: US 10,860,278 B2
(45) Date of Patent: Dec. 8, 2020

(54) DISPLAY DEVICE

(71) Applicant: Samsung Display Co., Ltd., Yongin-si (KR)

(72) Inventors: Chang Ho Hyun, Seoul (KR); Hyeong Gwaon Kim, Suwon-si (KR); Heung Suk Chin, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/420,091

(22) Filed: May 22, 2019

(65) Prior Publication Data
US 2019/0361659 A1 Nov. 28, 2019

(30) Foreign Application Priority Data

May 23, 2018 (KR) .................. 10-2018-0058335
May 20, 2019 (KR) .................. 10-2019-0058645

(51) Int. Cl.
*G06F 3/14* (2006.01)
*G09G 3/3258* (2016.01)

(52) U.S. Cl.
CPC ......... *G06F 3/1446* (2013.01); *G09G 3/3258* (2013.01); *G09G 2310/0264* (2013.01)

(58) Field of Classification Search
CPC .... G06F 3/1446; G06F 3/3258; G06F 3/1423; G06F 3/1431; B60K 35/00
See application file for complete search history.

(56) References Cited

U.S. PATENT DOCUMENTS

| | | | | |
|---|---|---|---|---|
| 7,821,474 B2* | 10/2010 | Marcu | ...................... | G09G 3/20 345/4 |
| 8,943,427 B2* | 1/2015 | Heo | .................... | H04M 1/0206 715/768 |
| 8,976,323 B2* | 3/2015 | Smithwick | ........... | H04N 13/356 349/74 |
| 2005/0104801 A1* | 5/2005 | Sugiura | .................. | H01L 27/12 345/5 |
| 2012/0019463 A1 | 1/2012 | Ng et al. | | |
| 2014/0139562 A1* | 5/2014 | Nakasu | ................ | G09G 3/3614 345/690 |

FOREIGN PATENT DOCUMENTS

| | | |
|---|---|---|
| KR | 10-0512637 B1 | 9/2005 |
| KR | 10-2015-0093090 A | 8/2015 |
| KR | 10-2017-0115807 A | 10/2017 |
| KR | 10-1822893 B1 | 1/2018 |

* cited by examiner

*Primary Examiner* — Sardis F Azongha
(74) *Attorney, Agent, or Firm* — Lewis Roca Rothgerber Christie LLP

(57) ABSTRACT

Provided is a display device including a first display panel, a second display panel, and a driving unit that is electrically connected to the first display panel and to the second display panel, and that is configured to provide a driving signal, which is a voltage signal having periodicity, to the first display panel and to the second display panel.

20 Claims, 12 Drawing Sheets

DISPLAY DEVICE

CROSS-REFERENCE TO RELATED APPLICATION

This application claims priority to, and the benefit of, Korean Patent Application No. 10-2018-0058335, filed on May 23, 2018, and No. 10-2019-0058645, filed on May 20, 2019 in the Korean Intellectual Property Office, the disclosure of which is incorporated herein by reference in its entirety.

BACKGROUND

1. Field

The present disclosure relates to a display device.

2. Description of the Related Art

With the development of multimedia, display devices are becoming increasingly important. Accordingly, various types of display devices, such as liquid crystal displays (LCDs) and organic light emitting displays (OLEDs), are being used.

A display device having two display panels may include an independent driving unit for each display panel.

SUMMARY

Aspects of the present disclosure provide a display device in which two display panels are operated by one driving unit, or operate under the control of one driver.

According to an aspect of the present disclosure, there is provided a display device including a first display panel, a second display panel, and a driving unit that is electrically connected to the first display panel and to the second display panel, and that is configured to provide a driving signal, which is a voltage signal having periodicity, to the first display panel and to the second display panel.

A frequency of the driving signal may be in a range of about 60 Hz to about 250 Hz.

The frequency of the driving signal may be about 120 Hz.

The driving signal may include a voltage signal in a form of a pulse having a first voltage signal, and a second voltage signal that is higher in level than the first voltage signal.

The driving signal may include a first voltage signal transmitted to the first display panel, and a second voltage signal transmitted to the second display panel.

The driving signal may include a first time section in which the first voltage signal is transmitted, and a second time section in which the second voltage signal is transmitted.

The first time section and the second time section might not overlap each other.

A length of the first time section and a length of the second time section may be the same.

A length of the first time section may be greater than a length of the second time section.

The first time section and the second time section may overlap at least partially.

At least one of the first display panel and the second display panel may include a transparent material.

An angle of view of an image displayed on the first display panel may be different from an angle of view of an image displayed on the second display panel.

At least one of the first display panel and the second display panel may include a touch recognition member.

According to another aspect of the present disclosure, there is provided a display device including a first display panel, a second display panel, and a driving unit electrically connected to the first display panel and the second display panel, and including a gamma controller that is configured to provide a gamma voltage signal to the first display panel and to the second display panel.

The gamma controller may include a distribution circuit that is configured to distribute the gamma voltage signal.

The gamma voltage signal may include a voltage signal based on a linear gamma string.

The gamma voltage signal may include a first gamma voltage signal provided to the first display panel, and a second gamma voltage signal provided to the second display panel.

The first gamma voltage signal and the second gamma voltage signal may include voltage signals based on a same gamma string.

The gamma string may include a linear gamma string.

According to another aspect of the present disclosure, there is provided a display device including a first display panel, a second display panel, and a driving unit that is electrically connected to the first display panel and the second display panel, and configured to provide a driving signal including a voltage signal having periodicity, and to provide a gamma voltage signal including a voltage signal based on a linear gamma string to the first display panel and the second display panel.

According to the disclosed embodiments, the two panels are operated by one driving unit, thereby making it possible to reduce the weight and size of the display device. In addition, the user may be able to recognize a three-dimensional stereoscopic image without the aid of a separate device, such as a pair of glasses.

Other features and embodiments may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
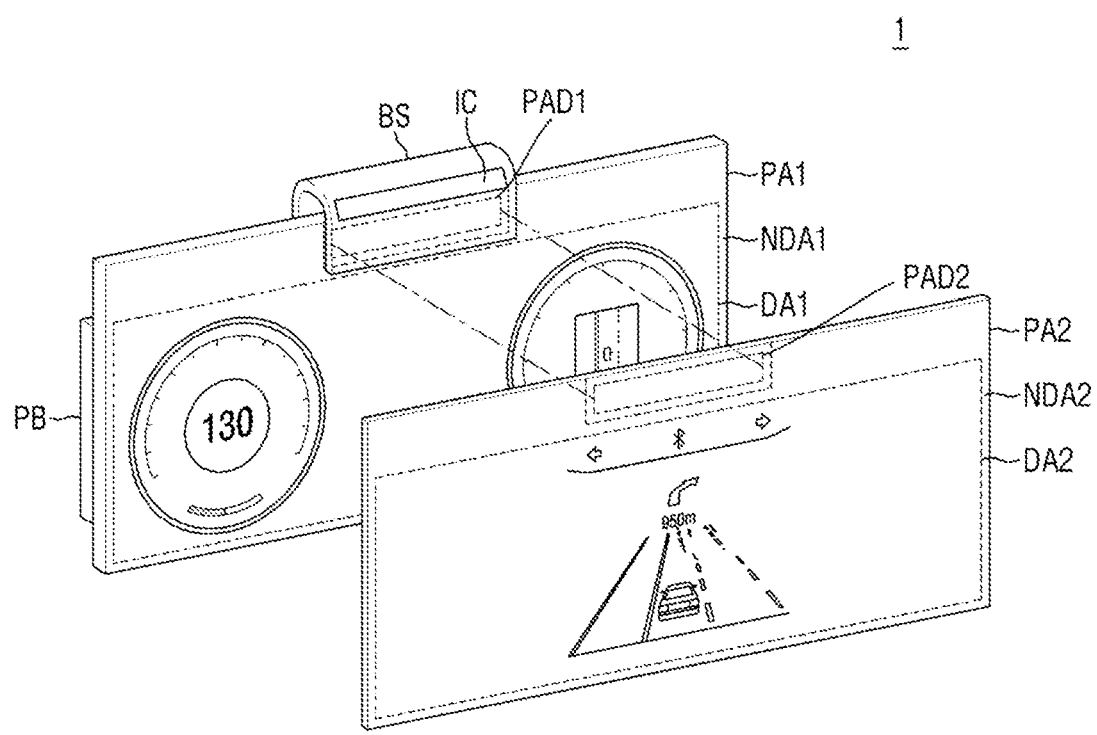
FIG. 1 is an exploded perspective view of a display device according to an embodiment.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present invention.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Display devices according to various embodiments of the present document are devices for displaying moving images or still images, and/or are devices for displaying stereoscopic images. The display devices may be used as display screens of portable electronic devices, such as a vehicle cluster, a vehicle head-up display (HUD), a mobile communication terminal, a smartphone, a tablet computer, a smart watch and a navigation system, as well as display screens of various products such as a television, a notebook, a monitor, a billboard, and the Internet of things.

The display devices may be organic light emitting displays (OLEDs), liquid crystal displays (LCDs), field emission display (FED) panels, and electrophoresis devices. In the following embodiments, an OLED will be described as an example of a display device. However, the present disclosure may also be applied to other display devices unless the spirit of the present disclosure is changed.

Figure 2:
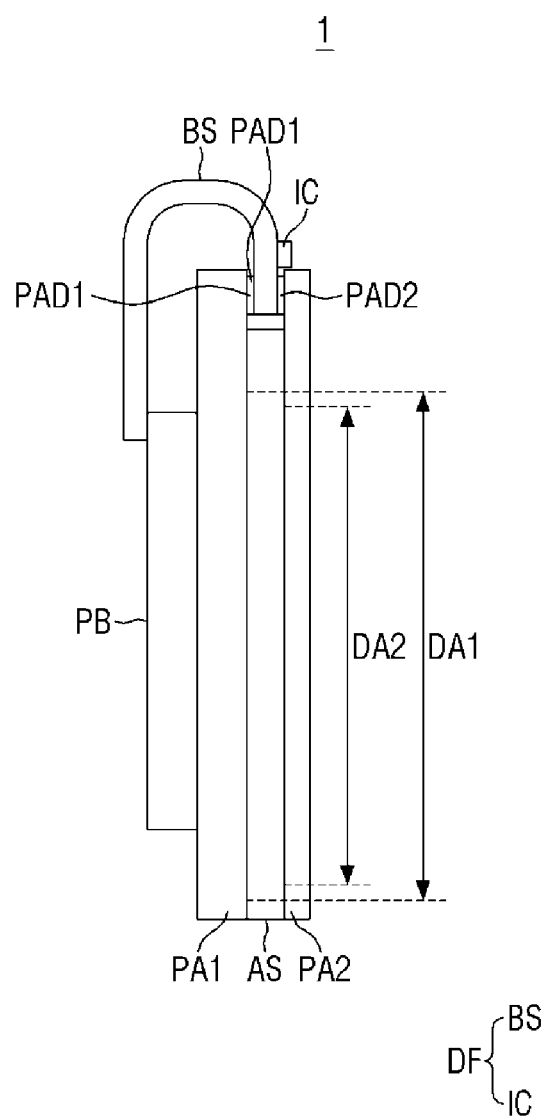
FIG. 2 is a side view of the display device.

FIG. 1 is an exploded perspective view of a display device 1 according to an embodiment. FIG. 2 is a side view of the display device 1.

Referring to FIGS. 1 and 2, the display device 1 includes a first display panel PA1, a second display panel PA2, a driving circuit board PB, and an adhesive member AS. The display device 1 may further include other elements, but the illustration and description of these elements are omitted herein.

The first display panel PA1 may include a first display area DA1 and a first non-display area NDA1.

The first display area DA1 is defined as an area of the first display panel PA1 where an image is displayed. The first display area DA1 may also be used as a detection member for detecting the external environment. That is, the first display area DA1 may be used as an area for displaying an image, or for recognizing a user's fingerprint or touch. The first display area DA1 may have a flat shape. Alternatively, at least part of the first display area DA1 may be bent.

The first non-display area NDA1 is located outside the first display area DA1, and is defined as an area where no image is displayed. In an embodiment, a first pad unit PAD1 for electrically connecting a driver chip IC and pixels and a sensor module may be located in the first non-display area NDA1. In an embodiment, the sensor module may include at least one of an illuminance sensor, a proximity sensor, an infrared sensor, and an ultrasonic sensor.

The first display panel PA1 may include a base substrate, and a plurality of pixels on the base substrate. The first display panel PA1 may display an image using the pixels in the first display area DA1.

In some embodiments, the first display panel PA1 may be an opaque display panel. For example, light provided to the first display panel PA1 may not pass through the first display panel PA1. Alternatively, in some other embodiments, the first display panel PA1 may be a transparent display panel. When the first display panel PA1 is a transparent display panel, a light shielding member for blocking transmission of incident light may be further disposed on a back surface of the first display panel PA1.

The base substrate of the first display panel PA1 may be an opaque insulating substrate. For example, the base substrate may be a silicon substrate, a glass substrate, or a plastic substrate including an opaque material.

The first pad unit PAD1 electrically connects the pixels of the first display panel PA1 and the driver chip IC. The first display panel PA1 may further include a wiring unit that electrically connects the pixels and the first pad unit PAD1. In addition, the first pad unit PAD1 may electrically connect the pixels of the first display panel PA1 and a power source.

The second display panel PA2 may include a second display area DA2 and a second non-display area NDA2, like the first display panel PA1.

The second display area DA2 is defined as an area of the second display panel PA2 where an image is displayed, and the second non-display area NDA2 is located outside the second display area DA2, and is defined as an area where no image is displayed. Redundant description of the second display area DA2 and the second non-display area NDA2 is omitted.

In some embodiments, the second display area DA2 may overlap the first display area DA1. In addition, in some embodiments, the second non-display area NDA2 may overlap the first non-display area NDA1.

In some embodiments, the second display panel PA2 may be a transparent display panel. For example, light provided to the second display panel PA2 may pass through the second display panel PA2. In some embodiments, an image provided on the first display area DA1 of the first display panel PA1 may be provided to a user through the second display panel PA2. That is, if an image displayed on the first display panel PA1 is referred to as a first image and an image provided on the second display panel PA2 is referred to as a second image, the first image may be provided to a user through the second display panel PA2, and the user can view both the first image and the second image.

The second display panel PA2 may include a transparent base substrate, unlike the first display panel PA1. For example, the base substrate of the second display panel PA2 may be a silicon substrate, a glass substrate, or a plastic substrate including a transparent material.

A case where the base substrate of the first display panel PA1 includes an opaque material, and where the base substrate of the second display panel PA2 includes a transparent material, has been described above. However, other embodiments are not limited to this case. For example, in an embodiment, both the base substrate of the first display panel PA1 and the base substrate of the second display panel PA2 may include a transparent material.

A second pad unit PAD2 electrically connects pixels of the second display panel PA2 and the driver chip IC. Like the first display panel PA1, the second display panel PA2 may further include a wiring unit that electrically connects the pixels and the second pad unit PAD2. In addition, the second pad unit PAD2 may electrically connect the pixels of the second display panel PA2 and the power source.

As described above, the respective pixels of the first display panel PA1 and the second display panel PA2 are connected to the same driver chip IC. Therefore, the first display panel PA1 and the second display panel PA2 may be driven by the same driving unit 10 (see FIG. 3). The driving of the display device 1 will be described in detail later with reference to FIGS. 3 and 4.

A driving circuit film DF may include a flexible base film BS, and a plurality of conductive wirings and the driver chip IC located on the base film BS.

The driving circuit film DF is coupled to the first pad unit PAD1 of the first display panel PA1, to the second pad unit PAD2 of the second display panel PA2, and to the driving circuit board PB. Accordingly, the first display panel PA1 and the second display panel PA2 are electrically connected to the driving circuit board PB by the driving circuit film DF.

In the present embodiment, one end of the driving circuit film DF is located between the first display panel PA1 and the second display panel PA2 to be electrically connected to the first pad unit PAD1 of the first display panel PA1, and to the second pad unit PAD2 of the second display panel PA2, while the other end of the driving circuit film DF is electrically connected to the driving circuit board PB. In addition, because the driving circuit board PB is located adjacent to a back surface of the first display panel PA1, the driving circuit film DF connected to the first display panel PA1 and the second display panel PA2 may be bent toward the driving circuit board PB, as illustrated in FIG. 2. Therefore, the first display panel PA1 and the second display panel PA2 can be electrically connected to the driving circuit board PB by the driving circuit film DF.

Here, although the driving circuit board PB is illustrated as being located on the back surface of the first display panel PA1, other embodiments are not limited to this case. For example, in an embodiment, the driving circuit board PB may be located on a side surface of the first display panel PA1. Even in this case, the driving circuit board PB may be electrically connected to the first display panel PA1 and the second display panel PA2 by the driving circuit film DF.

The adhesive member AS is located between the first display panel PA1 and the second display panel PA2, and bonds the first display panel PA1 and the second display panel PA2 together. Here, the adhesive member AS may be an adhesive film having light transmittance. For example, the adhesive member AS may be an optically clear adhesive (OCA) or an optically clear resin (OCR). The adhesive member AS is optional.

In an embodiment, a spacing panel may further be provided between the first display panel PA1 and the second display panel PA2 to maintain a gap between the first display panel PA1 and the second display panel PA2.

The driving of the first display panel PA1 and the second display panel PA2 will now be described.

Figure 3:
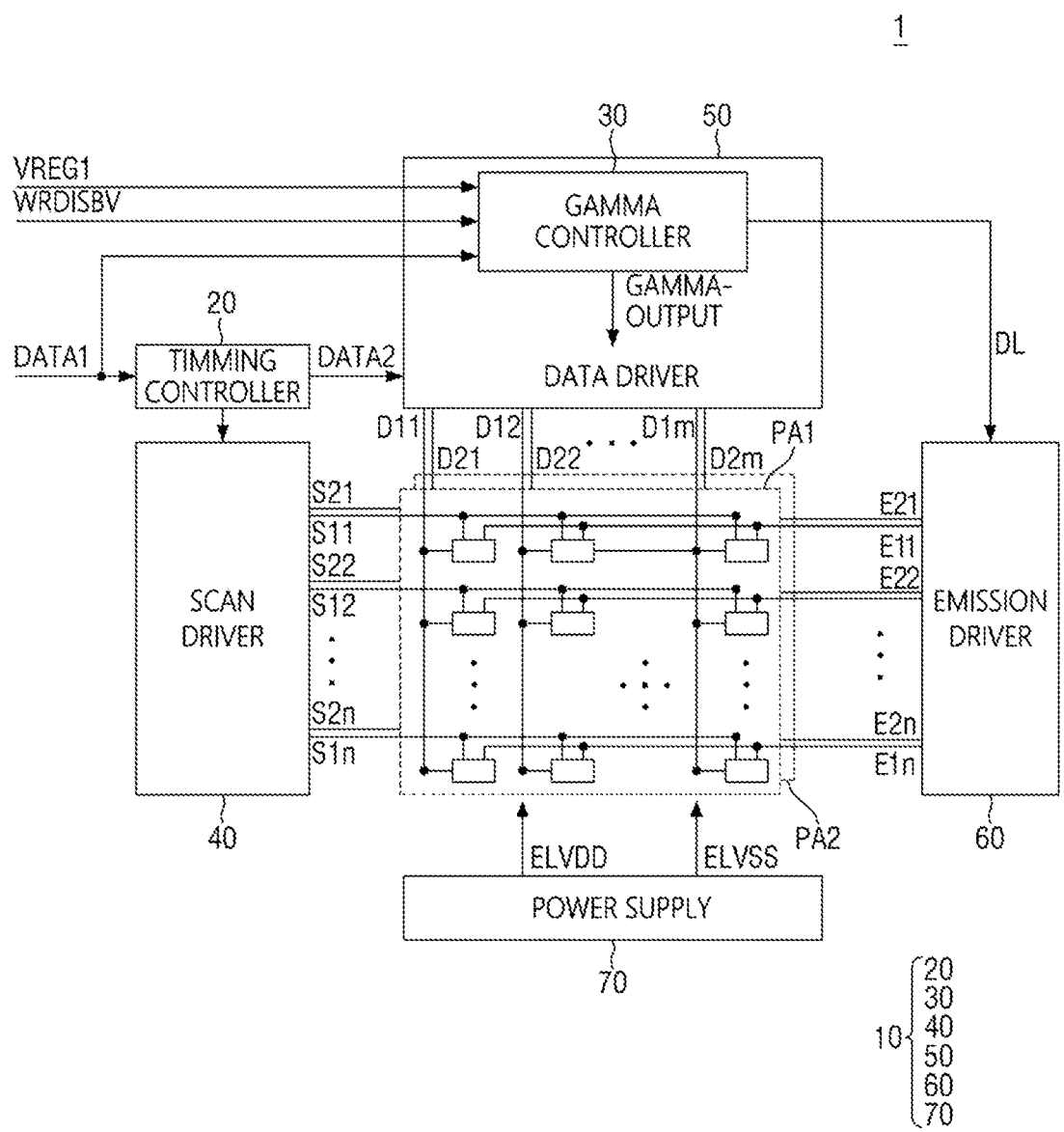
FIG. 3 is a block diagram of the display device.

FIG. 3 is a block diagram of the display device 1.

Referring to FIG. 3, the display device 1 may include the first display panel PA1, the second display panel PA2, and the driving unit 10 electrically connected to the first display panel PA1 and to the second display panel PA2. The driving unit 10 may include a timing controller 20, a gamma controller 30, a scan driver 40, a data driver 50, an emission driver 60, and a power supply 70. The display device 1 may display an image based on input data (e.g., first data DATA1) provided from an external device to the driving unit 10.

The first display panel PA1 may include gate lines S11 through S1$n$, data lines D11 through D1$m$, emission control lines E11 through E1$n$, and pixels, where n and m are integers of 2 or greater. The pixels may be located at respective crossing regions of the gate lines S11 through S1$n$, the data lines D11 through D1$m$, and the emission control lines E11 through E1$n$.

The pixels may store data signals (e.g., data signals provided through the data lines D11 through D1$m$) in response to gate signals (e.g., gate signals provided through the gate lines S11 through S1$n$), and may emit light at luminance levels corresponding to the data signals in response to emission control signals (e.g., emission control signals provided through the emission control lines E11 through E1$n$).

The pixels may each include subpixels. For example, each of the pixels may include a first subpixel that emits light of a first color (e.g., red), a second subpixel that emits light of a second color (e.g., green), and a third subpixel that emits light of a third color (e.g., blue).

The second display panel PA2 may include gate lines S21 through S2n, data lines D21 through D2m, emission control lines E21 through E2n, and pixels. The relationship between the gate lines S21 through S2n, the data lines D21 through D2m, the emission control lines E21 through E2n, and the pixels in the second display panel PA2 may be similar to that in the first display panel PA1, and thus repeated description will be omitted.

The timing controller 20 may convert (or may modulate) input data to be usable by the data driver 50, and may control the scan driver 40 and the data driver 50. For example, the timing controller 20 may generate a gate driving control signal, and may provide the gate driving control signal to the scan driver 40. The timing controller 20 may generate a data driving control signal, and may provide modulated data (e.g., second data DATA2) and the data driving control signal to the data driver 50.

The gamma controller 30 may calculate pixel usage based on input data, and may generate a gamma control signal GAMMA-OUTPUT and/or a dimming control signal DL (or an emission driving control signal) based on the calculated pixel usage. Here, the pixel usage refers to stress (or to data regarding the stress) that a pixel receives as the pixel is used, and may be proportional to a gray value corresponding to the pixel and the driving time of the pixel. The gamma control signal GAMMA-OUTPUT may include a gamma voltage, that is, a set value (or set values) used to adjust a reference gamma voltage for gamma voltages constituting data signals provided to the first display panel PA1 and the second display panel PA2 according to gray values. The dimming control signal DL may be a control signal for adjusting the emission time (or on-duty) of each pixel.

In addition, the gamma controller 30 receives a reference voltage VREG1, calculates the pixel usage by accumulating gray values corresponding to each pixel, calculates a gamma offset based on the pixel usage, and outputs the gamma control signal GAMMA-OUTPUT by correcting first and second gamma registers 31 and 32 (see FIG. 5) based on the gamma offset. Here, the first and second gamma registers 31 and 32 may include set values corresponding to reference gamma voltages VG1 and VG2 (see FIG. 5), and may be preset to generate the reference gamma voltages VG1 and VG2 (see FIG. 5) according to a gamma curve (e.g., a linear gamma curve (see FIG. 6) based on a linear gamma string).

The gamma controller 30 performs a multi-time programmable (MTP) operation on a first reference gray value, and determines a first gamma offset corresponding to a first reference voltage. In addition, the gamma controller 30 performs an MTP operation on a second reference gray value that is greater than the first reference gray value, and determines a second gamma offset corresponding to a second reference voltage. The gamma controller 30 also performs an MTP operation on a base reference gray value that is smaller than the first reference gray value, and determines a base gamma offset.

Figure 6:
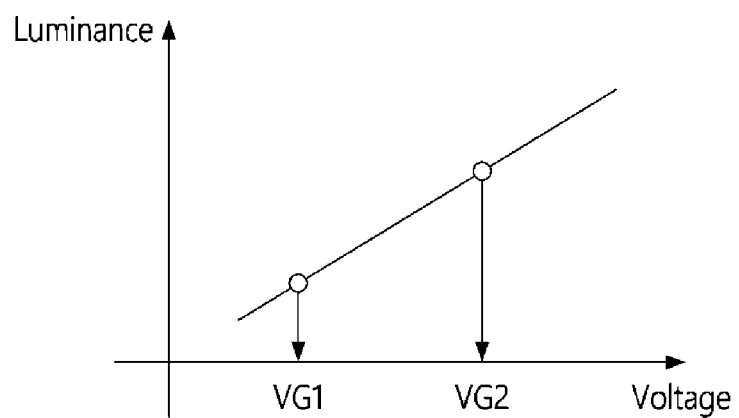
FIG. 6 is a graph of luminance with respect to voltage based on a linear gamma string.

The first reference gray value and the second reference gray value may be determined as appropriate values for implementing the linear gamma curve of FIG. 6.

The first and second gamma registers 31 and 32 and the gamma curve will be further described with reference to FIGS. 5 and 6.

The gamma controller 30 may receive a user dimming step WRDISBV from an external device (e.g., a user interface), may calculate a final dimming step by correcting the user dimming step WRDISBV based on the pixel usage, and may output the gamma control signal GAMMA-OUTPUT and/or the dimming control signal DL corresponding to the final dimming step. Here, the user dimming step WRDISBV may be a dimming step selected by a user from among a plurality of dimming steps (e.g., 256 dimming steps).

That is, the gamma controller 30 may calculate the pixel usage, and may correct the first and second gamma registers 31 and 32 or the user dimming step WRDISBV based on the pixel usage. In this case, the display device 1 may display an image with higher luminance (e.g., luminance obtained by compensating for luminance reduction due to pixel deterioration) based on the corrected first and second gamma registers 31 and 32 or the corrected user dimming step WRDISBV.

In FIG. 3, the gamma controller 30 is included in the data driver 50. However, the present disclosure is not limited to this case. In an embodiment, the gamma controller 30 may be included in the timing controller 20, or may be implemented independently of the timing controller 20 and the data driver 50.

The scan driver 40 (or a gate driver) may generate gate signals based on the gate driving control signal. The gate driving control signal may include a start signal (or a start pulse) and clock signals, and the scan driver 40 may include gate driving units (or shift registers) that sequentially generate gate signals based on the start signal and the clock signals. The scan driver 40 transmits the gate signals to the first display panel PA1 through the gate lines S11 through S1n connected to the first display panel PA1, and transmits the gate signals to the second display panel PA2 through the gate lines S21 through S2n connected to the second display panel PA2.

The scan driver 4Q may further include a gate signal multiplexer that distributes the gate signals to the first display panel PA1 and the second display panel PA2 according to the gate driving control signal.

Although the first display panel PA1 and the second display panel PA2 are all electrically connected to one scan driver 40 in the drawing, other embodiments are not limited to this case. For example, the display device 1 may include a first scan driver connected to the first display panel PA1, and a second scan driver connected to the second display panel PA2.

The gamma controller 30 included in the data driver 50 may generate the reference gamma voltages VG1 and VG2 based on the gamma control signal GAMMA-OUTPUT, and may generate a data signal corresponding to the modulated data (e.g., the second data DATA2) using the reference gamma voltages VG1 and VG2.

The data driver 50 may provide data signals to the first display panel PA1 and to the second display panel PA2 in response to the data driving control signal. Here, the data driver 50 may transmit the data signals to the first display panel PA1 through the data lines D11 through D1m connected to the first display panel PA1, and may transmit the data signals to the second display panel PA2 through the data lines D21 through D2m connected to the second display panel PA2. The data driver 50 may be electrically connected to both the first display panel PA1 and the second display panel PA2, and may provide the data signals to the first display panel PA1 and the second display panel PA2 according to the data driving control signal.

The data driver 50 may further include a data signal multiplexer that distributes the data signals to the first display panel PA1 and the second display panel PA2.

Although the first display panel PA1 and the second display panel PA2 are all electrically connected to one data driver 50 in the present embodiment, other embodiments are not limited to this case. In an embodiment, the display device 1 may include a first data driver connected to the first display panel PA1, and a second data driver connected to the second display panel PA2.

The emission driver 60 may generate emission control signals based on the dimming control signal DL (or the emission driving control signal), and may provide the emission control signals to the pixels through the emission control lines E11 through E1n and E21 through E2n. The emission driver 60 may determine the on-duty (or an emission period) and/or the off-duty (or a non-emission period) of each pixel based on the dimming control signal DL. The pixels may emit light in response to the emission control signals having a logic low level (or a low voltage, a low voltage level, or a turn-on voltage), and may not emit light in response to the emission control signals having a logic high level (or a high voltage, a high voltage level, or a turn-off voltage).

The power supply 70 may generate a driving voltage necessary for driving the display device 1. The driving voltage may include a first power supply voltage ELVDD and a second power supply voltage ELVSS. The first power supply voltage ELVDD may be higher than the second power supply voltage ELVSS.

As described above, the display device 1 may calculate pixel usage based on input data (e.g., the first data DATA1), may correct the first and second gamma registers 31 and 32 or the user dimming step WRDISBV based on the pixel usage, and may display an image with higher luminance based on the corrected first and second gamma registers 31 and 32 or the corrected user dimming step WRDISBV.

The driving of the first display panel PA1 and the second display panel PA2 will now be described.

Figure 4:
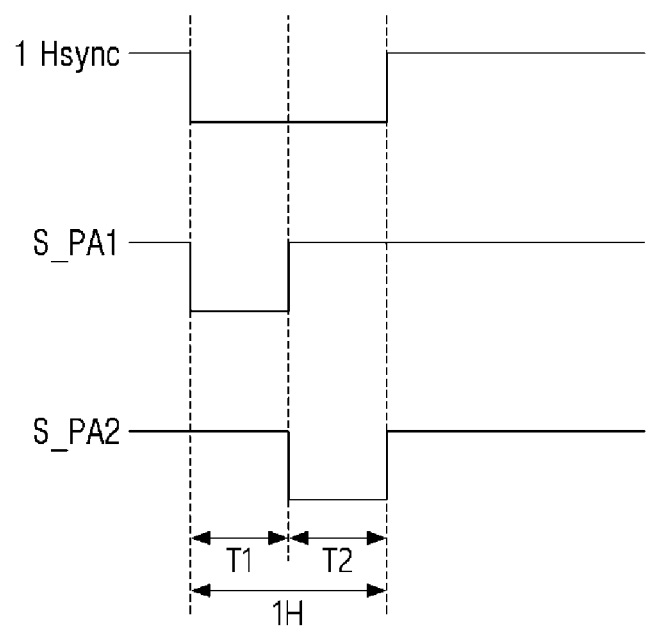
FIG. 4 shows schematic waveforms of driving signals of a first display panel and a second display panel.

FIG. 4 shows schematic waveforms of driving signals of the first display panel PA1 and the second display panel PA2.

Referring to FIG. 4, the display device 1 is time-divided into the first display panel PA1 and the second display panel PA2, and is driven accordingly during one horizontal period 1H defined by a horizontal synchronization signal Hsync. A driving signal may be provided from the driving unit 10 to the first display panel PA1 and the second display panel PA2.

In the current embodiment, the display device 1 may include a driving signal generator that generates a driving signal in a high frequency band. For example, the driving signal generated by the driving signal generator may be a voltage signal in the form of a pulse having a high frequency band of about 60 Hz to about 250 Hz and having periodicity. In an embodiment, the driving signal may also be a voltage signal in the form of a square wave, a sine wave, or a triangle wave. In the current embodiment, a case where the driving signal generator generates a driving signal in the form of a pulse having a frequency of about 120 Hz is described as an example.

One horizontal period 1H may include a first section T1 in which the first display panel PA1 is driven, and a second section T2 in which the second display panel PA2 is driven. In the first section T1, the driving signal is transmitted to the first display panel PA1. Similarly, in the second section T2, the driving signal is transmitted to the second display panel PA2. Because the first section T1 and the second section T2 exist independently and separately in one horizontal period 1H, the driving signal may be transmitted to the first display panel PA1 and the second display panel PA2 in a time-division manner.

A length of the first section T1 and a length of the second section T2 in one horizontal period 1H may be the same. That is, lengths of the driving signal provided to the first display panel PA1 and the second display panel PA2 during one horizontal period 1H may be the same. For example, one horizontal period 1H may be time-divided (e.g., into two halves), and the driving signal may be transmitted first to the first display panel PA1 and then to the second display panel PA2. That is, one horizontal period 1H may be about $\frac{1}{120}$ seconds, and the length of the first section T1 and the length of the second section T2 may each be about $\frac{1}{240}$ seconds. Alternatively, in an embodiment, the length of the first section T1 may be greater than the length of the second section T2. In another embodiment, the length of the second section T2 may be greater than the length of the first section T1. In an embodiment, the driving signal may be provided first to the second display panel PA2, and then to the first display panel PA1.

A high-frequency driving signal may be transmitted alternately to the first display panel PA1 and the second display panel PA2 in a time-division manner. In this case, when the pixels of the first display panel PA1 are turned on in response to the driving signal transmitted to the first display panel PA1, the pixels of the second display panel PA2 may be turned off. Conversely, when the pixels of the second display panel PA2 are turned on in response to the driving signal transmitted to the second display panel PA2, the pixels of the first display panel PA1 may be turned off. If the pixels of one panel are repeatedly turned on and off, a user may recognize the flicker of the display panel. However, because the flicker cycle is relatively short in a display device driven at a high frequency (e.g., about 120 Hz), the recognition of the flicker occurring in the display panel can be reduced or minimized.

Image quality control of the display device 1 will now be described.

Figure 5:
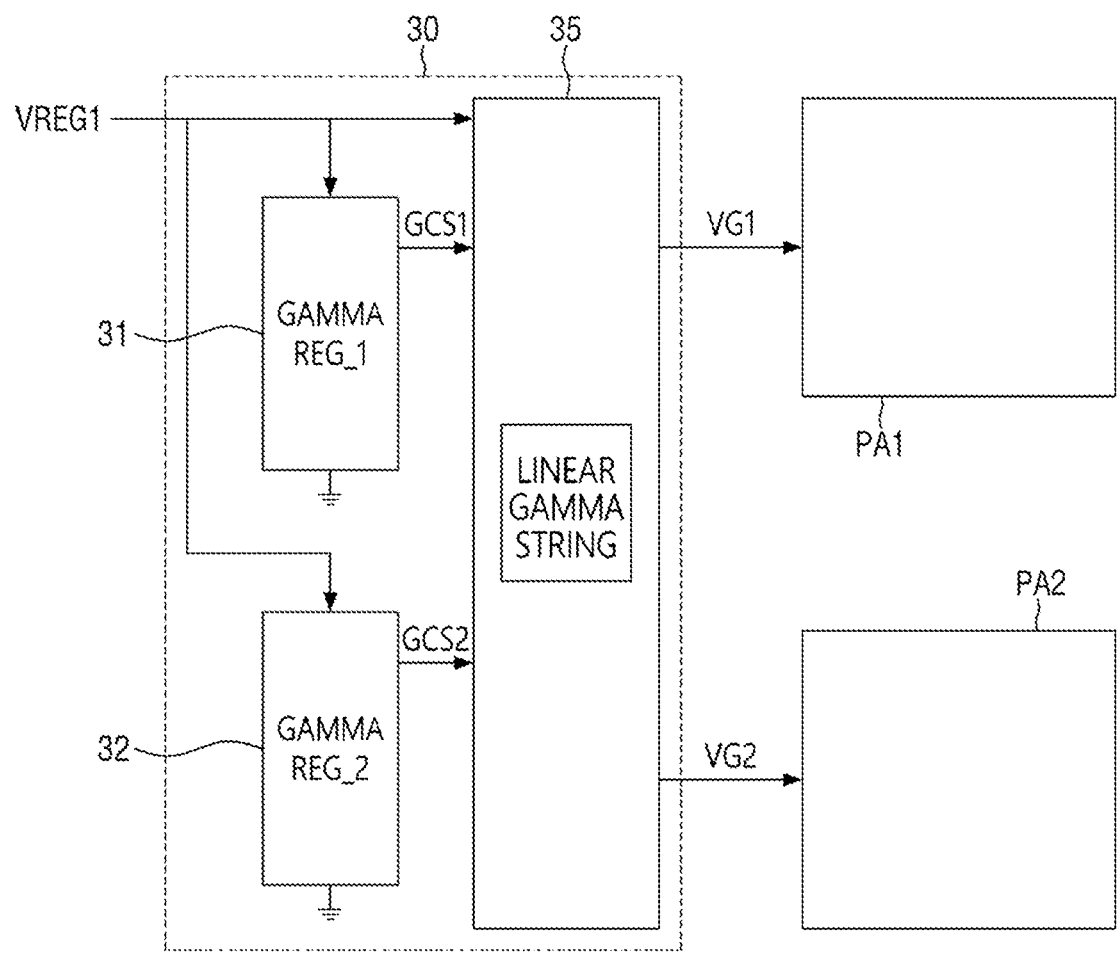
FIG. 5 is a block diagram of a gamma controller.

FIG. 5 is a block diagram of the gamma controller 30. FIG. 6 is a graph (a linear gamma curve) of luminance with respect to voltage based on a linear gamma string Referring to FIGS. 5 and 6, the gamma controller 30 may include the first and second gamma registers 31 and 32 and a distribution circuit 35, and may generate the reference gamma voltages VG1 and VG2 using the first and second gamma registers 31 and 32 and the distribution circuit 35. Here, the distribution circuit 35 may distribute the reference gamma voltages VG1 and VG2 respectively to the first display panel PA1 and the second display panel PA2 based on the linear gamma string The first gamma register 31 may divide the reference voltage VREG1. For example, the first gamma register 31 may include resistors connected in series between the reference voltage VREG1 and a ground voltage.

A first gamma control signal GCS1 generated by the first gamma register 31 may be provided to the distribution circuit 35. The distribution circuit 35 may distribute a gamma voltage based on the linear gamma string. In response to the first gamma control signal GCS1, the distribution circuit 35 may generate a value of the first reference gamma voltage VG1, which corresponds to a corresponding luminance value, based on the linear gamma string, and may provide the value of the first reference gamma voltage VG1 to the first display panel PA1 through the data driver 50.

Likewise, the second gamma register 32 may divide the reference voltage VREG1. For example, the second gamma register 32 may include resistors connected in series between the reference voltage VREG1 and the ground voltage. The second gamma register 32 may have a resistance value that is different from that of the first gamma register 31. For example, the resistance value of the first gamma register 31 may be greater than the value of the second gamma register 32. In other embodiments, the value of the second gamma register 32 may be greater than the value of the first gamma register 31, or the value of the first gamma register 31 and the value of the second gamma register 31 may be the same.

A second gamma control signal GCS2 generated by the second gamma register 32 may be provided to the distribution circuit 35. The distribution circuit 35 may distribute a gamma voltage based on the linear gamma string. In response to the second gamma control signal GCS2, the distribution circuit 35 may generate a value of the second reference gamma voltage VG2, which corresponds to a corresponding luminance value, based on the linear gamma string, and may provide the value of the second reference gamma voltage VG2 to the second display panel PA2 through the data driver 50.

In this way, the display device 1 may control image quality using the gamma controller 30 described above. However, the image quality control method is not limited to this method, and other methods may also be used to control image quality.

The display device 1 configured and driven as described above may perform driving control and image quality control by electrically connecting two display panels PA1 and PA2 to one driving unit 10.

In the current embodiment, the first display panel PA1 of the display device 1 may display a first image, and the second display panel PA2 may display a second image that has a different angle of view from that of the first image. In this case, a user simultaneously viewing the first image and the second image having different angles of view may recognize an image displayed on the display device 1 as a three-dimensional stereoscopic image (e.g., with the first image being viewed by one eye, and the second image being viewed by the other eye). The display device 1 may realize a three-dimensional stereoscopic image to be displayed by adjusting a distance between the first display panel PA1 and the second display panel PA2.

Alternatively, in an embodiment, at least one of the first display panel PA1 and the second display panel PA2 may further include a touch sensing member and/or a fingerprint recognition member. Thus, data input to the first display panel PA1 of the display device 1 by the user through touch recognition may also be displayed on the second display panel PA2.

Hereinafter, other embodiments will be described. A redundant description of elements and features identical to those described above with reference to FIGS. 1 through 6 will be omitted.

Figure 7:
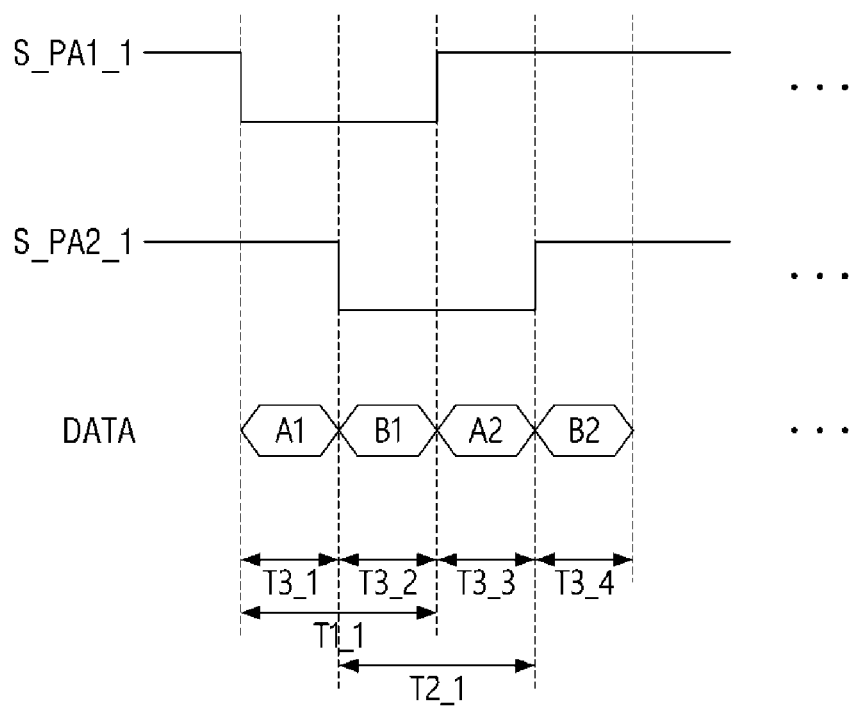
FIG. 7 shows schematic waveforms of driving signals of a display device according to an embodiment.

FIG. 7 shows schematic waveforms of driving signals of a display device according to an embodiment.

The display device 2 according to the embodiment of FIG. 7 is different from the display device 1 according to the embodiment of FIGS. 1 through 6 in that it includes a section in which a first display panel PA1 and a second display panel PA2 are simultaneously driven.

Referring to FIG. 7, a case where a gate signal maintains a high level due to a driving signal may be defined as a turn-off state, and a case where the gate signal changes from the high level to a low level and then maintains the low level may be defined as a turn-on state. In this case, the display device 2 may include a section wherein a section T1_1 in which a first gate signal S_PA1_1 provided to the first display panel PA1 is turned on overlaps a section T2_1 in which a second gate signal S_PA2_1 provided to the second display panel PA2 is turned on.

The display device 2 may include four independent data sections T3_1, T3_2, T3_3, and T3_4. For example, as illustrated in the drawing, the display device 2 may include a first data section T3_1 in which the first gate signal S_PA1_1 is defined as the turn-on state and the second gate signal S_PA2_1 is defined as the turn-off state, a second data section T3_2 in which the first gate signal S_PA1_1 is defined as the turn-on state and the second gate signal S_PA2_1 is defined as the turn-on state, a third data section T3_3 in which the first gate signal S_PA1_1 is defined as the turn-off state and the second gate signal S_PA2_1 is defined as the turn-on state, and a fourth data section T3_4 in which the first gate signal S_PA1_1 is defined as the turn-off state and the second gate signal S_PA2_1 is defined as the turn-off state.

Here, each data signal may be generated based on a pulse waveform of each gate signal S_PA1_1 or S_PA2_1. For example, when the first gate signal S_PA1_1 is in the turn-on state and the second gate signal S_PA2_1 is in the turn-off state in the first data section T3_1, a first data signal A1 may be generated. Similarly, a second data signal B1 may be generated in the second data section T3_2, a third data signal A2 may be generated in the third data section T3_3, and a fourth data signal B2 may be generated in the fourth data section T3_4.

Each data signal A1, B1, A2, or B2 generated by the data driver 50 is provided to each of the first display panel PA1 and the second display panel PA2.

If the display device 2 includes a section in which the first display panel PA1 and the second display panel PA2 are simultaneously driven, it can drive the first display panel PA1 and the second display panel PA2 without a reduction in scan-on time.

Figure 8:
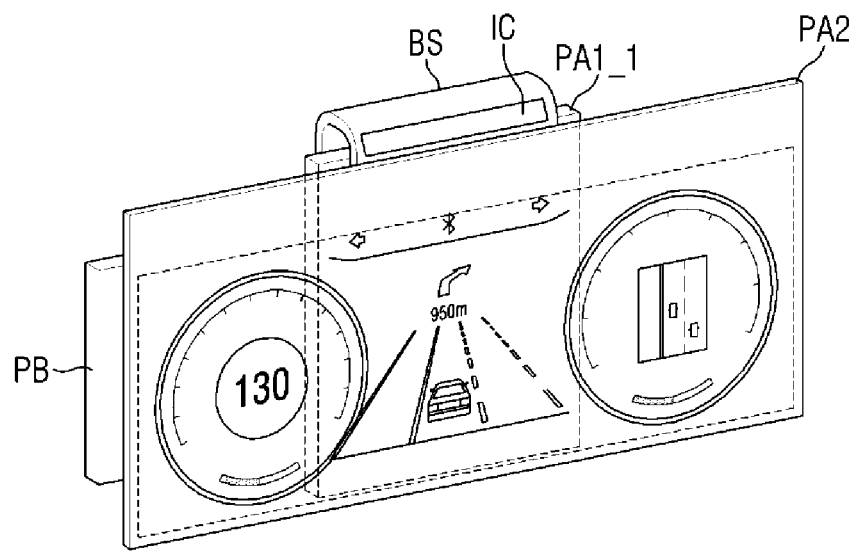
FIGS. 8 and 9 are schematic perspective views of display devices according to embodiments.
Figure 9:
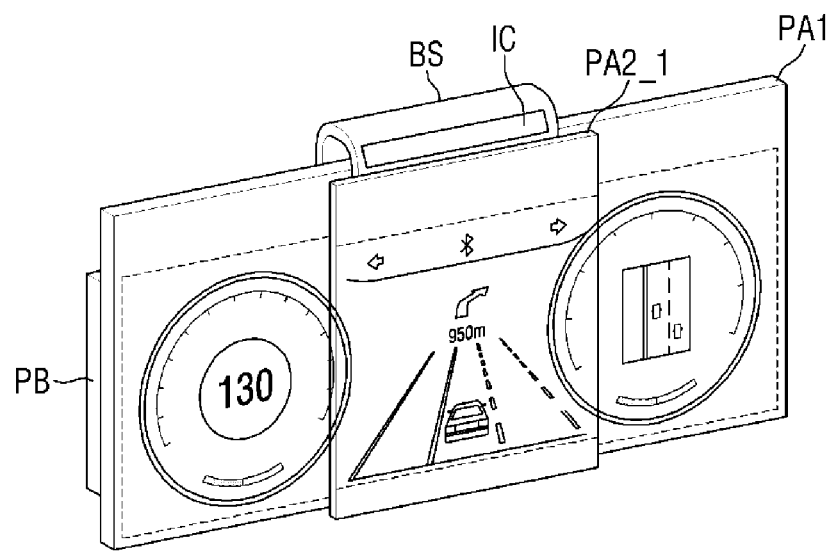

FIGS. 8 and 9 are schematic perspective views of display devices 3 and 4 according to embodiments.

The display device 3 according to the embodiment of FIG. 8 is different from the display device 1 according to the embodiment of FIGS. 1 through 6 in that the area of a first display panel PA1_1 is smaller than that of a second display panel PA2, and the display device 4 according to the embodiment of FIG. 9 is different from the display device 1 according to the embodiment of FIGS. 1 through 6 in that the area of a second display panel PA2_1 is smaller than that of a first display panel PA1. The embodiments of FIGS. 8 and 9 may include the same elements as the embodiment of FIGS. 1 through 6, except the area of each display panel PA1_1 or PA2_1.

Figure 10:
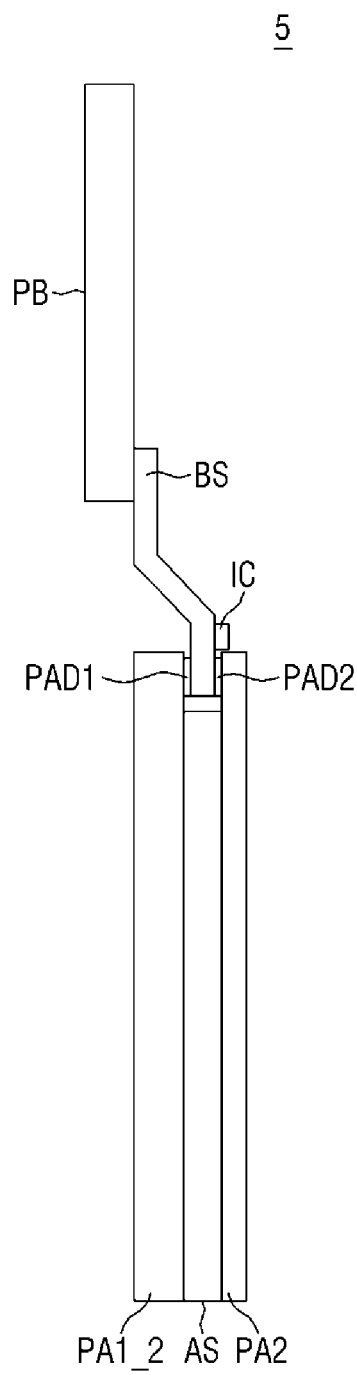
FIG. 10 is a schematic side view of a display device according to an embodiment.

FIG. 10 is a schematic side view of a display device 5 according to an embodiment.

The display device 5 according to the embodiment of FIG. 10 is different from the display device 1 according to the embodiment of FIGS. 1 through 6 in that a driving circuit board PB is located on a side surface of a first display panel PA1_2, instead of a back surface of the first display panel PA1_2, and the first display panel PA1_2 includes a transparent base substrate.

The display device 5 according to the current embodiment may include the first display panel PA1_2 made of a transparent material, like a second display panel PA2. In addition, the driving circuit board PB may be located on a side surface of the first display panel PA1_2.

Also, the first display panel PA1_2 may display a first image, and the second display panel PA2 may display a second image having an angle of view that is different from that of the first image. Therefore, a user simultaneously viewing the first image and the second image having different angles of view may recognize an image displayed on the display device 5 as a three-dimensional stereoscopic image.

In addition, because both the first display panel PA1_2 and the second display panel PA2 include a transparent material, the user can visually recognize the background located on the back surface of the first display panel PA1_2 without having his or her view obstructed by the first display panel PA1_2.

Figure 11:
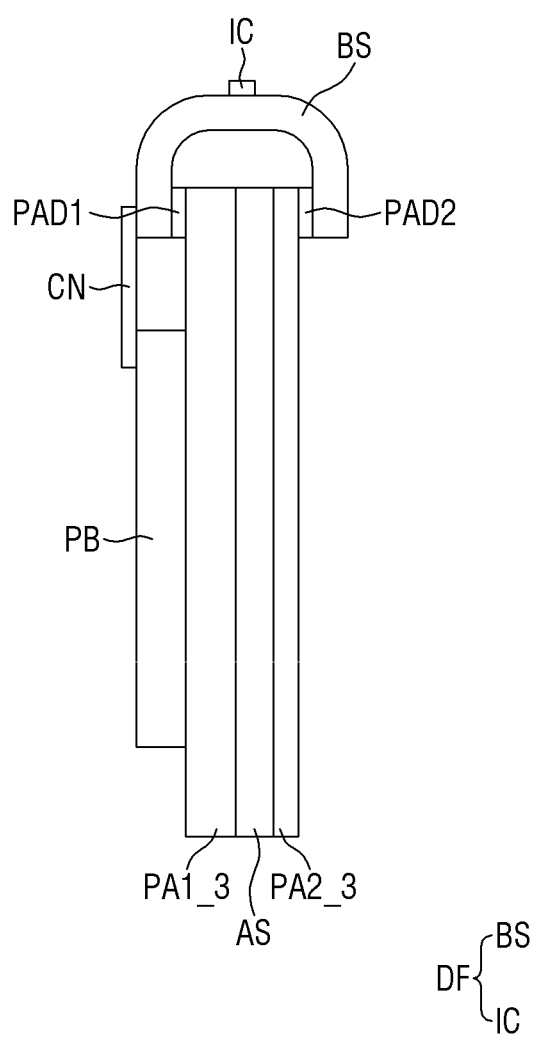
FIG. 11 is a schematic side view of a display device according to an embodiment.

FIG. 11 is a schematic side view of a display device 6 according to an embodiment.

Referring to FIG. 11, in the display device 6 according to the current embodiment, a first pad unit PAD1 of a first display panel PA1_3 may be provided on a lower side of the first display panel PA1_3 or a left side of the first display panel PA1_3 in the drawing, and a second pad unit PAD2 of a second display panel PA2_3 may be provided on an upper side of the second display panel PA2_3 or a right side of the second display panel PA2_3 in the drawing.

A side of a driving circuit film DF may be connected to the first pad unit PAD1, and the other side of the driving circuit film DF may be connected to the second pad unit PAD2.

In addition, the driving circuit film DF and a driving circuit board PB may be electrically connected to each other. In some embodiments, the driving circuit film DF and the driving circuit board PB may be electrically connected to each other by, e.g., a connecting member CN. The connecting member CN may be, but is not limited to, a flexible substrate including a connecting wiring.

Other details of each element are substantially the same or similar to those described above with reference to FIGS. 1 through 6.

Figure 12:
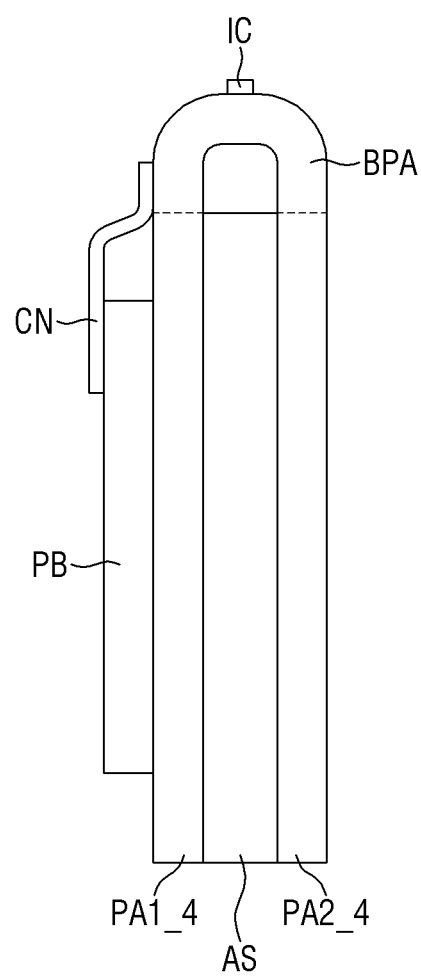
FIG. 12 is a schematic side view of a display device according to an embodiment.

FIG. 12 is a schematic side view of a display device 7 according to an embodiment.

Referring to FIG. 12, in the display device 7 according to the current embodiment, a bending portion BPA may be located between a first display panel PA1_4 and a second display panel PA2_4, and a driver chip IC may be mounted on the bending portion BPA.

In some embodiments, the first display panel PA1_4, the second display panel PA2_4 and the bending portion BPA may be integrally formed. That is, in some embodiments, the first display panel PA1_4, the second display panel PA2_4, and the bending portion BPA may be part of one flexible display panel. The first display panel PA1_4 may be a first area of the flexible display panel, the second display panel PA2_4 may be a second area different from the first area of the flexible display panel, and the bending portion BPA may be a bent third area located between the first area and the second area of the flexible display panel.

The driver chip IC mounted on the bending portion BPA may be electrically connected to a driving circuit board PB by, e.g., a connecting member CN. The connecting member CN may be, but is not limited to, a flexible substrate including a connecting wiring.

Other details of each element are substantially the same or similar to those described above with reference to FIGS. 1 through 6.

According to embodiments, because two panels are operated by one driving unit, the weight and size of a display device can be reduced. In addition, a user can recognize a three-dimensional stereoscopic image without the aid of equipment such as glasses.

However, the effects of the embodiments are not restricted to those set forth herein. The above and other effects of the embodiments will become more apparent to one of daily skill in the art to which the embodiments pertain by referencing the claims, with equivalents thereof to be included.

What is claimed is:

1. A display device comprising:
   a first display panel;
   a second display panel; and
   a driving unit that is electrically connected to the first display panel and to the second display panel, and that is configured to provide a driving signal, which is a voltage signal having periodicity, to the first display panel and to the second display panel such that the first display panel is driven for a first period during which the second display panel is not driven, and such that the second display panel is driven for a second period during which the first display panel is not driven.

2. The display device of claim 1, wherein a frequency of the driving signal is in a range of about 60 Hz to about 250 Hz.

3. The display device of claim 2, wherein the frequency of the driving signal is about 120 Hz.

4. The display device of claim 1, wherein the driving signal comprises a voltage signal in a form of a pulse having a first voltage signal, and a second voltage signal that is higher in level than the first voltage signal.

5. The display device of claim 1, wherein the driving signal comprises a first voltage signal transmitted to the first display panel, and a second voltage signal transmitted to the second display panel.

6. The display device of claim 5, wherein the driving signal comprises a first time section in which the first voltage signal is transmitted, and a second time section in which the second voltage signal is transmitted.

7. The display device of claim 6, wherein the first time section and the second time section do not overlap each other.

8. The display device of claim 7, wherein a length of the first time section and a length of the second time section are the same.

9. The display device of claim 7, wherein a length of the first time section is greater than a length of the second time section.

10. The display device of claim 6, wherein the first time section and the second time section overlap at least partially.

11. The display device of claim 1, wherein at least one of the first display panel and the second display panel comprises a transparent material.

12. The display device of claim 1, wherein an angle of view of an image displayed on the first display panel is different from an angle of view of an image displayed on the second display panel.

13. The display device of claim 1, wherein at least one of the first display panel and the second display panel comprises a touch recognition member.

14. A display device comprising:
   a first display panel;
   a second display panel; and
   a driving unit electrically connected to the first display panel and the second display panel, and comprising a gamma controller that is configured to provide a gamma voltage signal to the first display panel and to the second display panel,
   wherein the first display panel is driven for a first period during which the second display panel is not driven, and
   wherein the second display panel is driven for a second period during which the first display panel is not driven.

15. The display device of claim 14, wherein the gamma controller comprises a distribution circuit that is configured to distribute the gamma voltage signal.

16. The display device of claim 14, wherein the gamma voltage signal comprises a voltage signal based on a linear gamma string.

17. The display device of claim 14, wherein the gamma voltage signal comprises a first gamma voltage signal provided to the first display panel, and a second gamma voltage signal provided to the second display panel.

18. The display device of claim 17, wherein the first gamma voltage signal and the second gamma voltage signal comprise voltage signals based on a same gamma string.

19. The display device of claim 18, wherein the gamma string comprises a linear gamma string.

20. A display device comprising:
- a first display panel;
- a second display panel; and
- a driving unit that is electrically connected to the first display panel and the second display panel, and configured to provide a driving signal comprising a voltage signal having periodicity such that the first display panel is driven for a first period during which the second display panel is not driven, and such that the second display panel is driven for a second period during which the first display panel is not driven, and to provide a gamma voltage signal comprising a voltage signal based on a linear gamma string to the first display panel and the second display panel.

* * * * *